United States Patent
Gilchrist (12)

(10) Patent No.: US 6,773,222 B1
(45) Date of Patent: Aug. 10, 2004

(54) SPRING BIASED WHEEL LIFTING DOLLY

(76) Inventor: Fred Gilchrist, 24247 Norfolk, Detroit, MI (US) 48219

( * ) Notice: Subject to any disclaimer, the term of this patent is extended or adjusted under 35 U.S.C. 154(b) by 72 days.

(21) Appl. No.: 10/122,911

(22) Filed: Apr. 12, 2002

(51) Int. Cl.[7] ............................................. B60B 29/00
(52) U.S. Cl. ...................................... 414/427; 414/426
(58) Field of Search ................................. 414/426, 427

(56) References Cited

U.S. PATENT DOCUMENTS

| | | | |
|---|---|---|---|
| 2,379,587 A | * | 7/1945 | Moore .......................... 414/427 |
| 2,516,260 A | * | 7/1950 | Schildmeier ................. 414/427 |
| 3,059,274 A | * | 10/1962 | Fassero et al. ........... 414/427 R |
| 3,836,027 A | | 9/1974 | Gardner |
| 4,050,597 A | | 9/1977 | Hawkins |
| D257,246 S | | 10/1980 | Hihara |
| 4,460,306 A | | 7/1984 | Hawkins |
| 5,176,487 A | | 1/1993 | Flitton |
| 5,348,438 A | | 9/1994 | Roberts |

* cited by examiner

*Primary Examiner*—Steven A. Bratlie

(57) ABSTRACT

A spring biased wheel lifting dolly for raising or lowering wheels for mounting/un-mounting from vehicle. The spring biased wheel lifting dolly includes a "U" shaped carriage set with wheels for mobility. The carriage supports a mast containing a compression coil spring within. A tiltable boom is attached to the mast by a slidable collar. The boom may be raised or lowered along the mast. The boom includes two or more tire supporting arms to support or guide the tire. A shaft is inserted into the mast in a telescoping manner, which compresses the spring contained therein. A chain or beaded cable may be attached at one end to one or more gradient points on the shaft. The other end may be attached to the boom collar. Once attached, the spring bias provided by the coil spring can act to assist a user to lift the tire and supporting boom to the level desired.

18 Claims, 3 Drawing Sheets

SPRING BIASED WHEEL LIFTING DOLLY

BACKGROUND OF THE INVENTION

1. Field of the Invention

The present invention relates to wheel lifting dollies and more particularly pertains to a new spring biased wheel lifting a dolly for raising or lowering wheels for mounting/un-mounting from vehicle.

2. Description of the Prior Art

The use of wheel lifting dollies is known in the prior art. More specifically, wheel lifting dollies heretofore devised and utilized are known to consist basically of familiar, expected and obvious structural configurations, notwithstanding the myriad of designs encompassed by the crowded prior art, which have been developed for the fulfillment of countless objectives and requirements.

Known prior art includes U.S. Pat. No. 3,836,027, which teaches a dolly comprising a "U" shaped carriage set with wheels and a crossbar with tire supporting arms that is raised and lowered through the agency of a hydraulic jack. The patent does not teach the use of a spring bias as a lifting or lowering mechanism.

U.S. Pat. No. 4,050,597 teaches a dolly comprising a "U" shaped carriage set with three wheels supporting a pair of rails to which a crossbar assembly is attached. The crossbar assembly includes tire supporting arms. The assembly can be raised and lowered through the agency of a hydraulic jack and a telescoping screw support. The patent does not teach the use of a spring bias as a lifting or lowering mechanism.

U.S. Pat. No. 4,460,306 teaches a dolly comprising a "U" shaped carriage set with casters. The carriage supports a longitudinally disposed tiltable frame for supporting the tires that is raised and lowered through the agency of a hydraulic jack. The patent does not teach the use of a spring bias as a lifting or lowering mechanism.

U.S. Pat. No. 5,176,487 teaches a dolly comprising a "U" shaped carriage set with rollers that can raise and lower a tire by using the entire assembly as a lever arm. The patent does not teach the use of a spring bias as a lifting or lowering mechanism.

U.S. Pat. No. 5,348,438 teaches a dolly comprising a dual wheelbarrow like carriage that can raise and lower a tire by using the entire assembly as a lever arm. The patent does not teach the use of a spring bias as a lifting or lowering mechanism.

U.S. Pat. No. Des. 257,246 teaches the ornamental design of a tire lifting dolly incorporating a "U" shaped carriage set with wheels supporting two masts. The masts carry a crossbar with tire supporting arms that is raised and lowered through the agency of a foot-actuated jack. The patent does not teach the use of a spring bias as a lifting or lowering mechanism.

While these devices fulfill their respective, particular objectives and requirements, the aforementioned patents do not disclose a new spring biased wheel lifting dolly. The inventive device includes a "U" shaped carriage set with wheels for mobility. The carriage supports a mast containing a compression coil spring A tiltable boom is attached to the mast by a slidable collar. The boom may be raised or lowered along the mast. The boom includes two or more tire supporting arms to support or guide the tire. A shaft is inserted into the mast in a telescoping manner, which compresses the spring contained therein. A chain or beaded cable may be attached at one end to one or more gradient points on the shaft. The other end may be attached to the boom collar. Once attached, the spring bias provided by the coil spring can act to assist a user to lift the tire and supporting boom to the level desired.

In these respects, the spring biased wheel lifting dolly according to the present invention substantially departs from the conventional concepts and designs of the prior art, and in so doing provides an apparatus primarily developed for the purpose of raising or lowering wheels for mounting/un-mounting from vehicle.

SUMMARY OF THE INVENTION

In view of the foregoing disadvantages inherent in the known types of wheel lifting dollies now present in the prior art, the present invention provides a new spring biased wheel lifting dolly construction wherein the same can be utilized for raising or lowering wheels for mounting/un-mounting from vehicle.

The general purpose of the present invention, which will be described subsequently in greater detail, is to provide a new spring biased wheel lifting dolly apparatus and method which has many of the advantages of the wheel lifting dollies mentioned heretofore and many novel features that result in a new spring biased wheel lifting dolly, which is not anticipated, rendered obvious, suggested, or even implied by any of the prior art wheel lifting dollies, either alone or in any combination thereof.

To attain this, the present invention generally comprises a "U" shaped carriage set with wheels for mobility. The carriage supports a mast containing a compression coil spring within. A tiltable boom is attached to the mast by a slidable collar. The boom may be raised or lowered along the mast. The boom includes two or more tire supporting arms to support or guide the tire. A shaft is inserted into the mast in a telescoping manner, which compresses the spring contained therein. A chain or beaded cable may be attached at one end to one or more gradient points on the shaft. The other end may be attached to the boom collar. Once attached, the spring bias provided by the coil spring can act to assist a user to lift the tire and supporting boom to the level desired.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new spring biased wheel lifting dolly apparatus and method which has many of the advantages of the wheel lifting dollies mentioned heretofore and many novel features that result in a new spring biased wheel lifting dolly, which is not anticipated, rendered obvious, suggested, or even implied by any of the prior art wheel lifting dollies, either alone or in any combination thereof.

It is another object of the present invention to provide a new spring biased wheel lifting dolly, which may be easily and efficiently manufactured and marketed.

It is a further object of the present invention to provide a new spring biased wheel lifting dolly, which is of a durable and reliable construction.

An even further object of the present invention is to provide a new spring biased wheel lifting dolly, which is susceptible of a low cost of manufacture with regard to both materials and labor, and which accordingly is then susceptible of low prices of sale to the consuming public, thereby making such spring biased wheel lifting dolly economically available to the buying public.

Still yet another object of the present invention is to provide a new spring biased wheel lifting dolly, which provides in the apparatuses and methods of the prior art some of the advantages thereof, while simultaneously overcoming some of the disadvantages normally associated therewith.

Still another object of the present invention is to provide a new spring biased wheel lifting dolly for raising or lowering wheels for mounting/un-mounting from vehicle.

Yet another object of the present invention is to provide a new spring biased wheel lifting dolly, which includes a "U" shaped carriage set with wheels for mobility. The carriage supports a mast containing a compression coil spring within. A tiltable boom is attached to the mast by a slidable collar. The boom may be raised or lowered along the mast. The boom includes two or more tire supporting arms to support or guide the tire. A shaft is inserted into the mast in a telescoping manner, which compresses the spring contained therein. A chain or beaded cable may be attached at one end to one or more gradient points on the shaft. The other end may be attached to the boom collar. Once attached, the spring bias provided by the coil spring can act to assist a user to lift the tire and supporting boom to the level desired.

Still yet another object of the present invention is to provide a new spring biased wheel lifting dolly that includes a method to support the tire that does not rely on a mechanical, pneumatic or hydraulic jack.

Even still another object of the present invention is to provide a new spring biased wheel lifting dolly that has a scarcity of moving parts.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
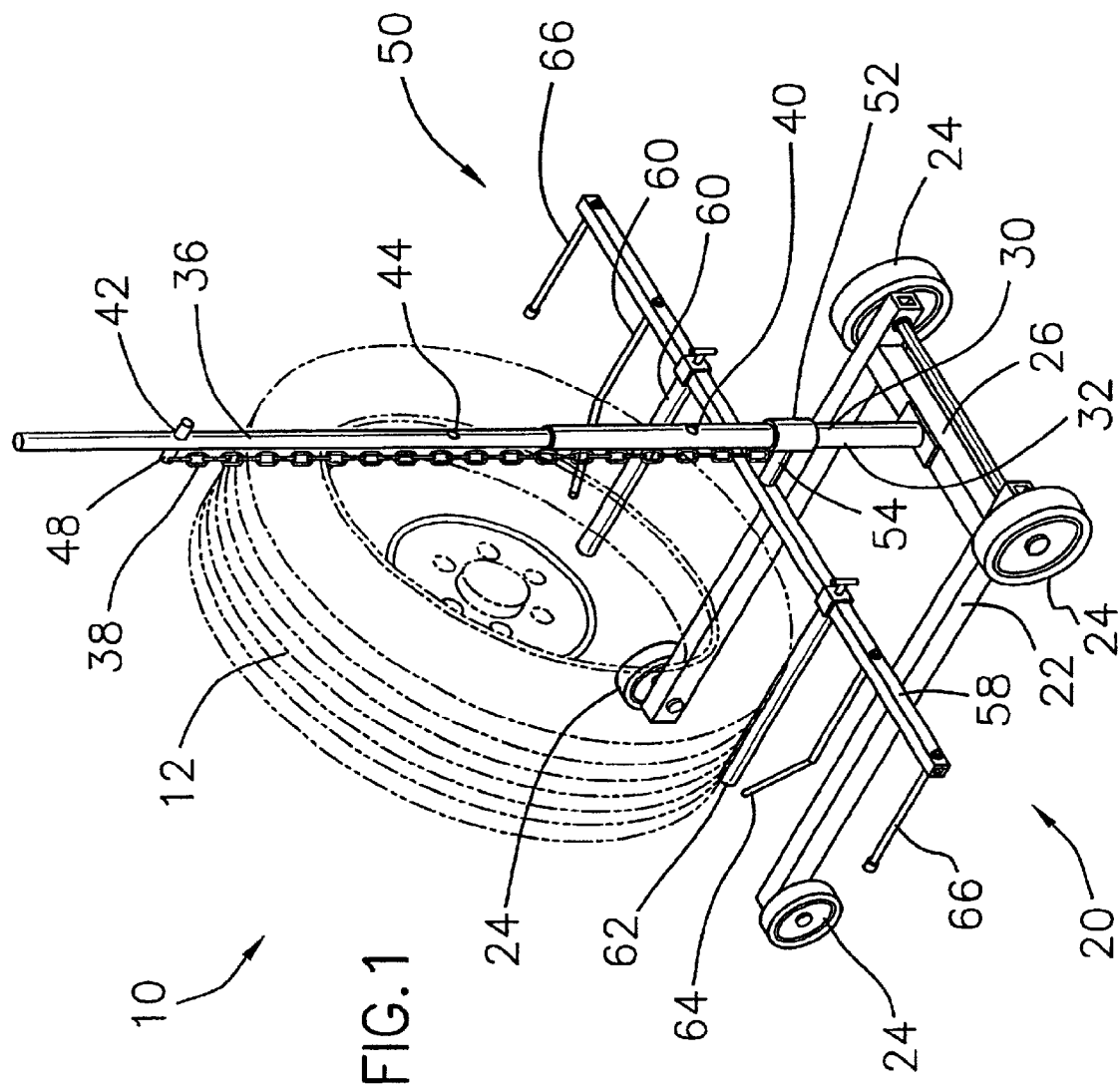
FIG. 1 is a perspective view of a new spring biased wheel lifting dolly according to the present invention. The tire is shown in dotted lines
Figure 2:
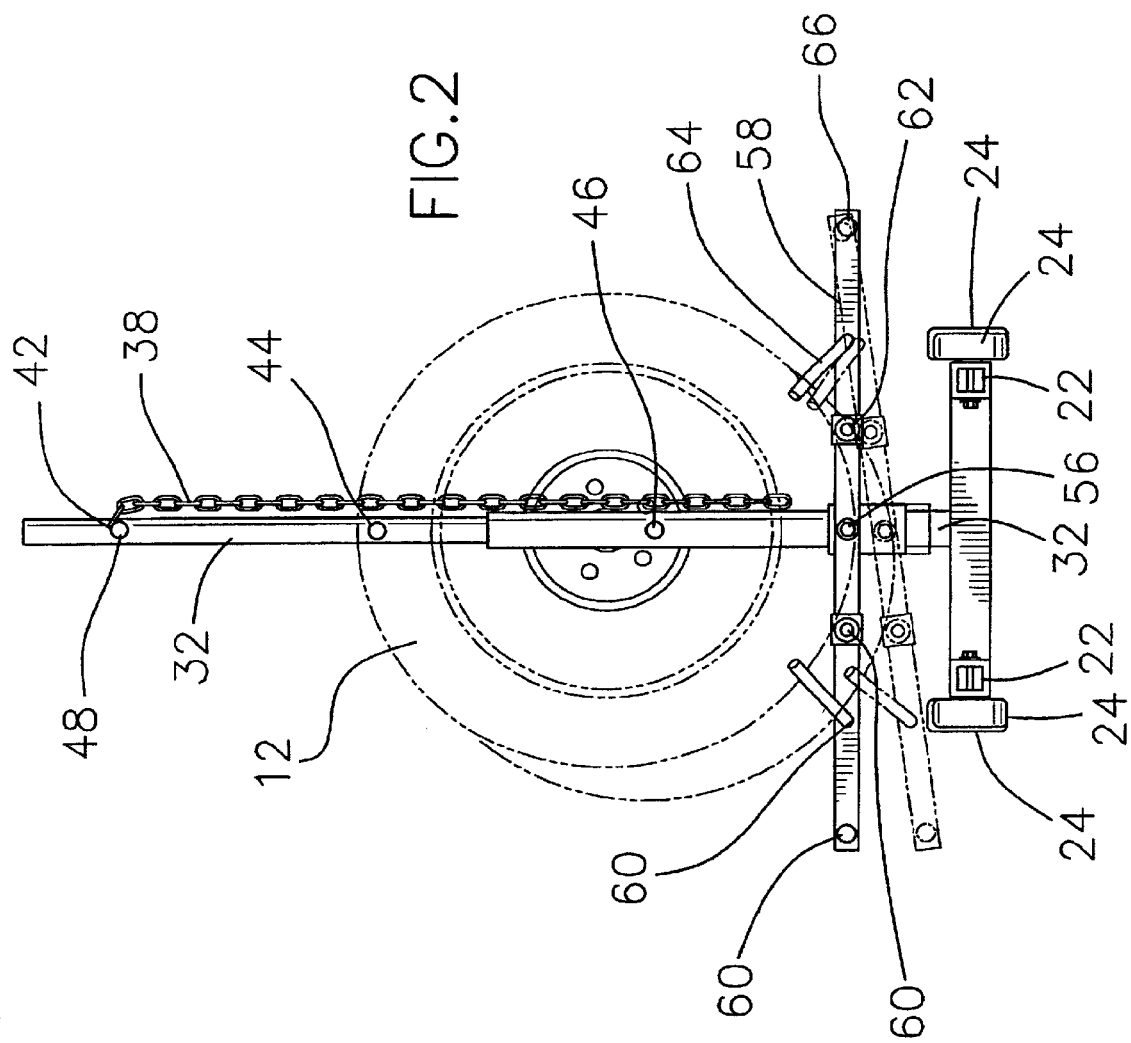
FIG. 2 is a front view of the present invention. The tire is shown in dotted lines, as is the position of the boom in a tilted attitude.
Figure 3:
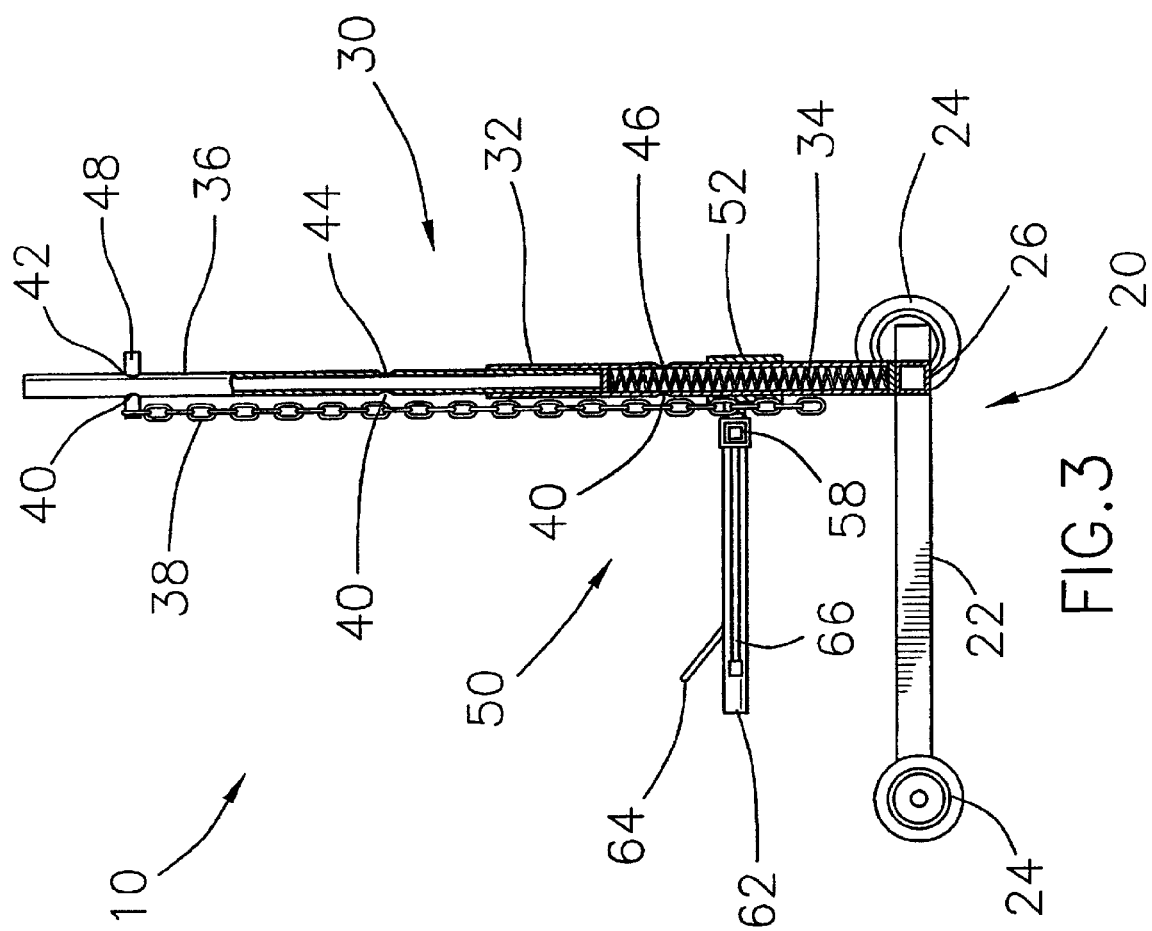
FIG. 3 is a cross sectional view of the present invention showing the lifting mechanism.

With reference now to the drawings, and in particular to FIGS. 1 through 3 thereof, a new spring biased wheel lifting dolly embodying the principles and concepts of the present invention and generally designated by the reference numeral 10 will be described.

As best illustrated in FIGS. 1 through 3, the spring biased wheel lifting dolly 10 generally may comprise a "U" or "H" shaped carriage 20 which may include three structural members, such as a pair of rails 22 and a cross piece 26. The cross piece 26 may connect the two rails 22 set parallel to one another other at relatively equal lengths either at or near one end of the rails 22. If connected at the end, the configuration would generally form a "U" shape. If connected near one end, the configuration would generally form an "H" shape. Wheels 24 may be mounted near or at the ends of the rails 22. The illustrations depict a simple wheel 24 attached by an axle fixed to the side of the rail 22, though the invention is not so limited. For example, the wheel 24 may comprise rollers, casters, treads, etc. without departing from the invention. The arrangement of the wheels 24, and the structural members (such as rails 22 or cross pieces) may comprise a wheeled platform generally referred to in the art as a dolly or carriage 20.

The carriage supports a spar assembly 30 which may comprise a base mast 32, and upper shaft 36, a compression spring 34, and a number of anchor holes 40. The mast 32 is fixed to the carriage 20. The carriage may comprise a rigid conduit for bearing the weight the shaft 36, boom assembly 50, and tire 12. The rigid conduit may also act as a guide for the boom assembly 50. A compression spring 34 may be positioned inside the bottom of the mast 32. The compression 34 spring may provide a spring bias to assist in maneuvering the tire to a desired position. The spring demonstrated in FIG. 3 is a coil spring with space between the coils so that it can be compressed to a fraction of its' length at rest. The radius of the compression spring 34 is less than the inside radius of the mast 32 so that it can fit inside. The shaft 36 may also be designed to fit in the interior of the mast 32. The shaft 36 may fit in a manner of nesting in the mast 32 so that the two would be able to slide with respect to each other in a telescoping manner. The shaft 36 may sit atop the compression spring 34 so that the weight of the shaft 36 and anything that may be attached to it bears upon the compression spring 34. The shape of the cross section of the mast 32 and/or shaft may be circular forming a cylindrical shape, or optionally have a square or rectangular shape. Virtually any shape may be possible as long as the shaft is nestable in the mast 32. Along the spar assembly there may be a number of anchor holes 40.

Three anchor holes 40 are shown in the drawings, although many other anchor holes 40 may be included in other variations. The anchor hole 40 located on the mast 32 section of the spar assembly 30 may be referred to as the mast anchor hole 46. The anchor hole just above the mast anchor hole 46 may be referred to as the lower shaft anchor hole 44 and the top most anchor hole 40 may be referred to as the upper shaft anchor hole 42. Each anchor hole may comprise an opening going all the way through the spar assembly 30. The anchor holes 40 are designed to receive a pin 48 for attaching a flexible member 38 or for locking the shaft and mast together in the position of compression.

A boom assembly 50 may be slidably mounted to the mast 32 portion of the spar assembly 30. The boom assembly 50 may comprise a yoke 52 to slidably engage the circumference of the mast 32, a neck 54 which may extend from the yoke 52 to the boom 58, an axis 56 allowing the boom 58 to tilt, and a number of tines 60 to support and guide the tire 12 and/or the spring biased tire lifting dolly itself. The yoke 52 may comprise a collar encircling the mast 32. The cross sectional shape of the yoke may conform to the cross sectional shape of the mast 32. The yoke 52 may slide up and down the length of the mast 32 and if the cross sectional shape of the mast 32 is round, the yoke would also be able to turn on the mast 32 as an axle. A neck 54 may project from the yoke 52 at a generally perpendicular angle. The neck 54 may be used to attach the boom 58 to the yoke 52 and may also be used to engage the flexible member 38 and thereby transfer the weight of the tire 12, boom assembly 50 and shaft 36 onto the compression spring 34. The boom 58 may be attached to the neck 54 on an axis 56 or axle to allow the boom to tilt.

The boom 58 may include a number of tines 60 projecting relatively perpendicularly from the boom 58 in a relatively horizontal attitude. The tines 60 may be employed to support or guide the tire 12, and may take a variety of forms. In the illustrations, three types are depicted. The tire support tines 62 are the pair positioned closest to the neck 54. The tire support tines 62 may be relatively straight and robust, as their main function is the support of the tire 12 when the tire is mounted on and dismounted from a vehicle. The second set of tines may have an upward bend and may be referred to as a guide tine 64. The guide tine 64 supports the tire 12 when the tire is being loaded onto the boom 58. The angled portion helps to guide the tire 12 to a full upright position on the tire support tines 62. The outermost tines 60 may include rubber bumpers or feet to make contact with the vehicle and may be referred to as feeler tines 66.

The flexible member 38 may comprise a chain, cable, beaded cable, or line that has means for attachment at both ends and/or along its' length. The flexible member 38 may be connected to the upper shaft anchor hole 42 or any other anchor hole 40 desired. The purpose for the flexible member 38 is to support the boom assembly 50 by suspending it from the shaft 36. The flexible member supports the weight of the boom assembly 50 and/or the tire 12 by looping under the neck 54 and then attaching to the shaft 36 or to itself.

In use, the spring biased wheel lifting dolly 10 is stored in a configuration wherein the compression spring 34 is not locked in a compressed position. It is assumed for the purpose of the example that the user is dismounting a wheel of a vehicle. The user first loosens the lug nuts of the wheel and elevates the vehicle to a point where the wheel is off the ground. The spring biased wheel lifting dolly 10 may then be brought near the wheel. The boom assembly may be lifted under the wheel or tire 12 until the tire support tines 62 make contact with the wheel. The flexible member 38 may be looped under the neck and reattached either to an anchor point on the shaft 36 or attached back to itself as is practiced with chains. When the tire 12 is removed from the hub of the vehicle, the added weight of the tire 12 may compress the compression spring 34 and lower the boom assembly 50 and the tire 12 toward the floor. The spring biased wheel lifting dolly 10 may then be rolled on the carriage 20 to wherever the user desired to move the wheel. Before removing the tire from the boom assembly, the user may push or lift the boom assembly so that the lower shaft anchor hole 44 mates with the mast anchor hole 46, and a pin 48 may be inserted through the mated holes 44 and 46 to lock the mechanism in the compressed position. By tilting the boom, the tire can roll down the tines 60 and onto the floor.

After making repairs to the tire 12, the user may then roll the tire 12 up the tines 60 on one side of the boom 58 until the tire rests on the tire support tines 62. Guide tines 64 may help to guide the tire 12 so that is stays in an upright position towards the base of the tines 60. The spring biased wheel lifting dolly 10 may then be rolled back to the vehicle for remounting the tire 12. By disengaging the pin 48 from the mast and lower shaft anchor holes 44 and 46, the tire 12 should return to the relative height it was at just after removal. The compression spring 34 (due to the spring bias) should assist in holding the tire near the level the tire 12 needs to be positioned at for remounting. The device thus facilitates moving the tire a relatively short distance without the user having to support the full weight of the tire during the mounting process. After the tire 12 is mounted, the flexible member 38 may be decoupled from the anchor hole 40 or from itself.

The user may first push the shaft 36 into the mast 32 by compressing the compression spring 34. When the lower shaft anchor hole 44 is mated with the mast anchor hole 46, a pin may be inserted through the mated holes to lock the mechanism in the compressed position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for lifting wheels comprising:
   a carriage structure including wheels for making the device mobile;
   a spar assembly comprising:
   a mast having an interior;
   a biasing apparatus mounted on the mast;
   a shaft disposed in the interior of the mast in a telescopic manner;
   a plurality of anchoring holes formed in the mast
   at least one pin for being removably inserted into the anchoring holes;
   a boom assembly comprising:

a yoke slidably mounted on the mast for sliding along the mast;

a neck projecting from the yoke;

a boom rotationally attached to the neck;

at least two tines mounted on the boom for supporting a wheel;

a flexible member anchored to the shaft for engaging the neck so that the boom assembly is substantially supported by the shaft; and the boom being positioned proximate the carriage structure such that the boom is positioned under the tire and engages a bottom portion of the tire to inhibit the boom from impacting and damaging the vehicle when the boom engages the tire.

2. The device of claim 1 wherein the carriage structure comprises a pair of rails and a cross piece.

3. The device of claim 1 wherein the carriage structure is relatively "U" shaped.

4. The device of claim 1 wherein the carriage structure is relatively "H" shaped.

5. The device of claim 1 wherein the wheels comprise casters.

6. The device of claim 1 wherein an exterior of the shaft of the spar assembly is substantially cylindrical.

7. The device of claim 1 wherein the biasing apparatus comprises a spring.

8. The device of claim 7 wherein the spring comprises a compression spring.

9. The device of claim 1 wherein the yoke is rotatable around the mast.

10. The device of claim 1 wherein a length of the neck between the yoke and boom is substantially equal to a width of the flexible member.

11. The device of claim 1 wherein the tines on the boom form a ramp when the boom is tilted such that a first end of the boom is lower than a second end of the boom.

12. The device of claim 1 wherein the flexible member comprises a chain.

13. A device for lifting wheels comprising:

a carriage structure comprising:
 a pair of parallel rails;
 a cross piece attached to the pair of rails;
 two wheels;

a spar assembly comprising:

a mast having an interior;
 a biasing spring positioned in the interior of the mast;
 a shaft disposed in the interior of the mast in a telescopic manner;

a plurality of anchoring holes;

at least one pin for being removably inserted in the anchoring holes a boom assembly comprising:
 a yoke mounted on the mast in a manner permitting the yoke to slide along the mast and to rotate about the mast:

a neck projecting from the yoke;
 a boom rotationally attached to the neck so that it can tilt from a horizontal orientation;

at least two tines for supporting the wheel on the boom;

a chain anchored to the shaft for engaging the neck of the boom assembly so that the boom assembly is substantially supported by the shaft of the spar assembly; and the boom being positioned proximate the carriage structure such that the boom is positioned under the tire and engages a bottom portion of the tire to inhibit the boom from impacting and damaging the vehicle when the boom engages the tire.

14. The device of claim 13 wherein the wheels include casters.

15. The device of claim 13 wherein the biasing spring comprises a compression spring.

16. The device of claim 13 wherein tines of the boom form a ramp for a wheel when the boom is tilted such that a first end of the boom is lower than a second end of the boom.

17. The device of claim 13 wherein the chain is connected to itself to form for a loop about the neck.

18. A device for lifting wheels comprising:

a carriage structure comprising:
 a pair of parallel rails;
 a cross piece attached to the pair of rails;
 two wheels;

a spar assembly comprising:
 a mast having an interior;
 a biasing spring positioned in the interior of the mast;
 a shaft disposed in the interior of the mast in a telescopic manner;
 a plurality of anchoring holes;
 at least one pin for being removably inserted in the anchoring holes;

a boom assembly comprising:
 a yoke mounted on the mast in a manner permitting the yoke to slide along the mast and to rotate about the mast:
 a neck projecting from the yoke;
 a boom rotationally attached to the neck so that it can tilt from a horizontal orientation;
 at least two tines for supporting the wheel on the boom; and
 a chain anchored to the shaft for engaging the neck of the boom assembly so that the boom assembly is substantially supported by the shaft of the spar assembly;

the boom being positioned proximate the carriage structure such that the boom is positioned under the tire and engages a bottom portion of the tire to inhibit the boom from impacting and damaging the vehicle when the boom engages the tire wherein the wheels include casters;

wherein the biasing spring comprises a compression spring;

wherein tines of the boom form a ramp for a wheel when the boom is tilted such that a first end of the boom is lower than a second end of the boom; and wherein the chain is connected to itself to form for a loop about the neck.

* * * * *